Sept. 5, 1939. K. BLASIG 2,172,315
FOLLOW-UP TYPE CONTROL DEVICE
Filed Dec. 14, 1937
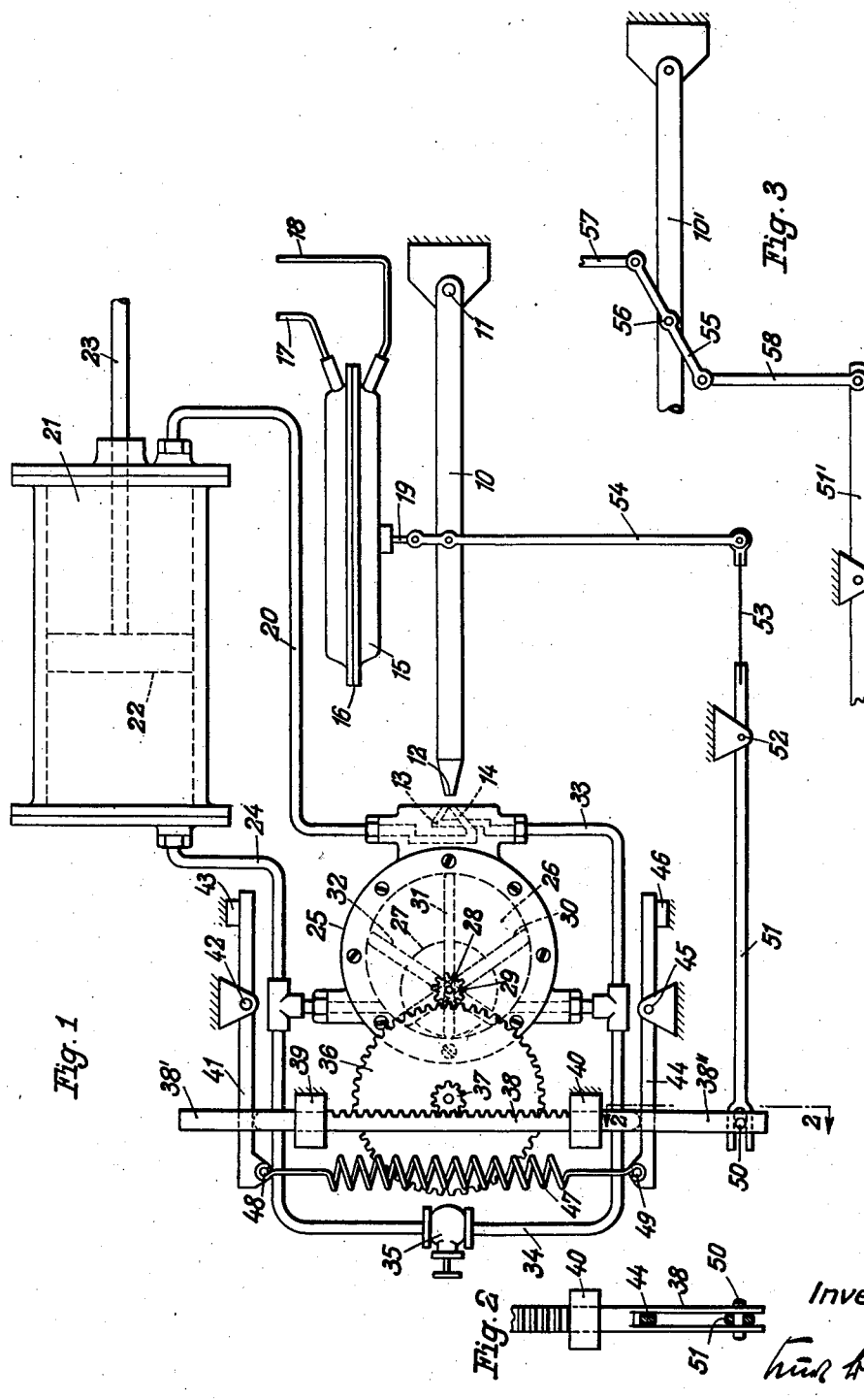
Inventor:
Kurt Blasig Patented Sept. 5, 1939

2,172,315

UNITED STATES PATENT OFFICE 2,172,315

FOLLOW-UP TYPE CONTROL DEVICE

Kurt Blasig, Berlin-Zehlendorf, Germany, assignor to Askania-Werke A. G., a corporation of Germany Application December 14, 1937, Serial No. 179,775
In Germany December 15, 1936

12 Claims. (Cl. 121—41)

This invention relates to control devices, more particularly to control devices of the pressure fluid type. By the term "control device" I wish to have understood in this application the combination of a relay controllable in response to relatively weak impulses and a servo-motor operated by said relay and moving in response to the controlling impulses acting on the relay. Control devices are widely used in the art, for example for controlling physical conditions, such as pressure, temperature, flow, humidity, and the like, or for controlling the course or attitude of craft by actuating steering elements, such as rudders or the like.

It has become the practice to avoid a possible "hunting" and "overshooting" of control devices by exerting on the relay not only a controlling impulse, but further a restoring impulse which is generally a function of the servo-motor movements. In installations, where the relay and the servo-motor are positioned remote from each other the problem of exerting a controlling impulse on the relay in exact response to the movements of the servo-motor becomes a serious one. To solve this problem it has been suggested to provide in control devices having a servo-motor for actuating the device to be controlled a second servo-motor of the cylinder and piston type and to connect the latter in line with the former to repeat the movements of the same. It has thus been possible to derive restoring impulses from the repeater servo-motor which may be positioned close to the pressure fluid relay.

This conventional construction entails considerable disadvantages in that the pressure fluid line connecting the relay and the operating servo-motor is interrupted by the repeater servo-motor, whereby a certain volume of pressure fluid becomes enclosed between the repeating and the operating servo-motor and becomes separated from the pressure fluid supplied by the relay. When a leakage occurs, the positional relation of the servo-motors becomes incorrect and air is likely to enter the conduit causing undesirable effects due to its compressibility. Furthermore a replacement of lost pressure fluid by pressure fluid from the relay becomes impossible due to the fact that the volume of pressure fluid is shut in between the pistons of the operating and repeating servo-motors.

A further and decided disadvantage of the conventional construction is that the repeater servo-motor must have a volumetric capacity equal to or greater than the repeating servo-motor. This fact makes the repeater servo-motor from which only relatively small forces have to be derived unnecessarily bulky.

It is accordingly an object of this invention to provide a novel control device which is free from the hereinbefore pointed out disadvantages.

According to this invention restoring impulses for the relay are derived from a rotary flow motor which is serially arranged with the operating servo-motor. The rotary motor can be made very small and its size is independent of the size of the operating servo-motor. Accordingly it thus becomes possible to unite the rotary flow motor and the pressure fluid relay to form a small unit.

Furthermore it is posible to produce a standard relay and restoring motor unit to which an operating servo-motor of any size may be connected.

Inasmuch as a rotary servo-motor is passed through by the pressure fluid for actuating the operating servo-motor any loss of pressure fluid due to a leakage of the system is immediately replaced by pressure fluid from the relay.

Further aims, objects, and advantages of this invention will appear from a consideration of the description which follows with the accompanying drawing showing for purely illustrative purposes embodiments of this invention. It is to be understood, however, that the description is not to be taken in a limiting sense, the scope of this invention being defined in the appended claims.

Referring to the drawing:

Fig. 1 is a diagrammatic illustration of a control device embodying the present invention.

Fig. 2 is a section taken on line 2—2 of Fig. 1.

Fig. 3 shows in detail a structure for modifying the device of Fig. 1.

In the illustrated embodiment a pressure fluid relay of the well-known Askania jet-pipe type is shown including a movable jet-pipe 10 pivoted at 11 and supplied with pressure fluid from a suitable source (not shown) which is issued from the jet-pipe nozzle at 12 into reception orifices 13 and 14 depending upon the relative position of the jet-pipe nozzle and the reception orifices. As a means for controlling the position of the jet-pipe a differential pressure device is shown comprising a diaphragm casing 15 separated into two chambers by a diaphragm 16. The diaphragm is acted upon by the pressure in conduits 17 and 18. The movement of the diaphragm 16 is transmitted to the jet-pipe by means of a link 19 exerting a controlling force on the relay.

The pressure fluid acting in the reception orifice 14 is conducted through a conduit 20 to an operating servo-motor having a cylinder 21 and a piston 22 movable therein. A piston rod 23 may be connected to a condition adjusting device, in case the control device is employed for controlling a condition, or to a rudder, in case the control device is employed to control the course or attitude of craft. Inasmuch as devices operated by the servo-motor 21, 22 are dispensable for understanding the present invention they are not shown in the drawing.

A second conduit 24 connects the operating servo-motor with a rotary flow motor 25 shown in the illustrated example as being of the slide-vane type. The illustrated motor includes a casing providing an internal chamber 26 in which a center body 27 is rotatable about an axis 28 driving a pinion 29. In the center body sliding vanes 30, 31, and 32 are mounted which are acted upon by pressure fluid flowing through the chamber, thereby rotating the center body. A further conduit 33 connects the rotary motor with the reception orifice 13.

In the illustrated embodiment the rotary flow motor is by-passed by a conduit 34 in which a throttle 35 is connected. A certain amount of pressure fluid will thus be permitted to flow past the rotary motor without actuating the same depending upon the resistance offered to the pressure fluid by the throttle 35.

The pinion 29 meshes with a gear 36 to which a second pinion 37 is secured meshing with a rack-bar 38. The rack-bar is slidable in guiding blocks 39 and 40.

Means are provided for biasing the rack-bar and accordingly also the rotary motor towards a predetermined position. For this purpose the outer ends of the rack-bar, in the illustrated embodiment 38' and 38'', are forked as becomes apparent from Fig. 2. The upper end 38' engages a lever 41 pivoted at 42 and limited in its movement by a fixed stop 43. The lower forked end 38'' of the rack-bar engages a lever 44 pivoted at 45 and limited in its movement by a fixed stop 46. The levers 41 and 44 are connected by means of a spring 47 connected in the illustrated embodiment to pins 48 and 49 in the levers.

When the rack-bar is moved in a downward direction, the lever 44 will be turned in counter-clockwise direction increasing the tension of the spring 47. The lever 41 will not be effected by such movements bearing against the stop 43, while the upper end 38' of the rack-bar is permitted to move relatively to the lever 41 by virtue of its being forked. The spring 47 will now tend to move the rack-bar towards its normal position in which the lever 44 comes to bear against its stop 46 receiving the remaining force of the spring.

A restoring impulse is derived from the rotary flow motor. For this purpose a pin 50 is secured to the rack-bar engaging the forked end of a lever 51 pivoted at 52 and taking part of the movements of the rotary flow motor. The second arm of the lever 51 is slotted and a flat spring 53 inserted therein for exerting a force which is a function of the lever displacement and accordingly a function of the movements of the rotary flow motor. The flat spring 53 is connected to act on the relay in opposition to the controlling means, a connecting rod 54 being shown for this purpose.

The operation of the device is as follows:

It may be first assumed that the throttle 35 be tightly shut preventing operating pressure fluid from by-passing the rotary motor 25. When the relay becomes actuated by a controlling force exerted by the controlling diaphragm 16 to register with the reception orifice 14, pressure fluid will flow through the conduit 20 and move the piston 22 of the operating servo-motor to the left. Pressure fluid displaced by the movement of the servo-motor piston will flow through the conduit 24 and cause the rotary flow motor to turn in clockwise direction. Accordingly, the gear 36 and pinion 37 will be rotated in counter-clockwise direction moving the rack-bar 38 downwardly. The lever 51 is turned in counter-clockwise direction about its pivot point and the spring 53 will exert a restoring force on the jet-pipe in opposition to the controlling force, thereby tending to move the relay into its neutral position. The magnitude of the restoring force is a function of the movements of the actuating servo-motor 21, 22 and the rotary flow motor 25 repeating the movements of the operating motor.

If the jet-pipe 10 is moved to register with the orifice 13 the operation of the control device is principally the same as described above. In this case the pressure fluid will flow through the conduit 33 and cause the rotary restoring motor to turn into anti-clockwise direction. At the same time, the pressure fluid acting upon the rotary return motor will flow through the conduit 24 to the servo-motor 21 displacing the piston 22 to the right. By the rotation of the rotary return motor the rack 38 will be moved upwardly so as to exert a restoring force on the jet-pipe 10.

If the pressure fluid coming from the jet-pipe 10 enters the orifice 13, the pressure fluid passes the rotary return motor before acting on the servo piston 22 whilst the pressure fluid passes the servo-motor 21 before reaching the return motor in case the pressure fluid enters the reception orifice 14. In both cases, however, the servo piston 22 will be moved the required amount as is well known. As may be seen from Fig. 1 the ratio of transmission between the rotary axis of the return flow motor and the rack 38 is such that the pressure fluid passing the rotary motor may displace the servo piston 22 the required amount before the restoring force exerted by the rotary motor is sufficient to restore the jet-pipe to its middle position against the counter-action of the impulse system 15, 16.

Assuming now that the throttle 35 be opened to permit a certain limited amount of pressure fluid to pass through the same the action of the restoring means will be modified as follows. Upon an actuation of the relay the servo-motor 21, 22 and the rotary flow motor will be actuated causing a movement of the rack-bar and an increase in tension of the spring 47. After the operating servo-motor 21, 22 comes to rest the spring 47 biasing the rotary flow motor will turn the same back to its normal position. The movement of the rotary flow motor caused by the spring 47 is delayed and depends upon the magnitude of the resistance offered to the pressure fluid by the throttle 35. By the movements of the rack-bar and the rotary flow motor towards the predetermined position to which it is biased the restoring impulse exerted on the relay becomes diminished and becomes zero after the levers 41 and 44 have come to bear against their respective stops.

From the foregoing it appears that the restoring impulse is only dependent upon the movement of the servo-motor 21, 22 and not upon the relative position of its piston and cylinder, since the rotary flow motor will be turned to its predetermined position under the action of the spring 47 irrespective of the relative position which the cylinder and piston of the operating servo-motor may have assumed. The time factor determining the lapse of time during which the restoring impulse on the relay will be reduced to zero can be varied by the adjustment of the throttle 35. When the resistance caused by the throttle 35 is great, considerable time will pass before the rotary flow motor is moved to its predetermined position to which it is biased and accordingly the restoring impulse will act on the relay during a considerable time. When the resistance offered by the throttle 35 is small, a restoring impulse will be reduced to zero after a correspondingly short time.

Instead of controlling the relay by force impulses as shown in Fig. 1, the relay may also be controlled in response to positional impulses. In Fig. 3 elements for modifying the device of Fig. 1 is shown to make the relay responsive to positional impulses. A double armed lever 55 is pivoted to the jet-pipe 10' at 56, links 57 and 58 being connected to the lever 55. Upon a controlling displacement of the link 57 the relay will be returned to its normal position by a corresponding movement of the restoring link 58.

Obviously, the present invention is not restricted to the particular embodiments herein shown and described. Moreover, it is not indispensable that all the features of this invention be used conjointly, since they may be employed advantageously in various combinations and subcombinations.

What is claimed is:

1. Control device comprising, in combination, a pressure fluid relay; a pressure fluid operated servo-motor connected to be actuated by said relay; and a rotary flow motor serially arranged with said servo-motor and connected to restore, upon actuations of said relay, the relay to its neutral position.

2. Control device comprising, in combination, a pressure fluid relay; a pressure fluid operated servo-motor connected to be actuated by said relay; a rotary flow motor serially arranged with said servo-motor; and means connected to be operated by said rotary flow motor for restoring said relay, upon actuation of the same, to its neutral position.

3. Control device comprising, in combination, a pressure fluid relay; controlling means for exerting a controlling impulse on said relay; a pressure fluid operated servo-motor connected to be actuated by said relay; a rotary flow motor serially arranged with said servo-motor; and means connected to be operated by said rotary flow motor for exerting a restoring impulse on said relay in opposition to said controlling means.

4. Control device comprising, in combination, a jet-pipe relay; controlling means for exerting a controlling impulse on said relay; a reciprorating servo-motor connected to be operated by said relay; a rotary flow motor serially arranged with said servo-motor; and means connected to be operated by said rotary flow motor for exerting a restoring impulse on said relay in opposition to said controlling means.

5. Control device comprising, in combination, a pressure fluid relay; a pressure fluid operated servo-motor connected to be actuated by said relay; a rotary flow motor serially arranged with said servo-motor; a throttle connected parallel to said rotary motor for by-passing the same; means for biasing said rotary motor towards a predetermined position; and means connected to be operated by said rotary flow motor for restoring said relay, upon actuation of the same, to its neutral position.

6. Control device comprising, in combination, a pressure fluid relay; controlling means for exerting a controlling impulse on said relay; a pressure fluid operated servo-motor connected to be actuated by said relay; a throttle connected parallel to said rotary motor for by-passing the same; means for biasing said rotary motor towards a predetermined position; and means connected to be operated by said rotary flow motor for exerting a restoring impulse on said relay in opposition to said controlling means.

7. Control device comprising, in combination, a jet-pipe relay; controlling means for exerting a controlling impulse on said relay; a reciprocating servo-motor connected to be operated by said relay; a rotary flow motor serially arranged with said servo-motor; a throttle connected parallel to said rotary motor for by-passing the same; means for biasing said rotary motor towards a predetermined position; and means connected to be operated by said rotary flow motor for exerting a restoring impulse on said relay in opposition to said controlling means.

8. Control device comprising, in combination, a pressure fluid relay; a pressure fluid operated servo-motor connected to be actuated by said relay; a rotary flow motor serially arranged with said servo-motor; a throttle connected parallel to said rotary motor for by-passing the same; a rack-bar driven by said rotary flow motor; a spring biasing said rack-bar towards a predetermined position, whereby also the rotary motor becomes biased; and means for exerting a restoring impulse on said relay in response to movements of said rack-bar.

9. Control device comprising, in combination, a pressure fluid relay; means for exerting a controlling force on said relay; a pressure fluid operated servo-motor connected to be actuated by said relay; a rotary flow motor serially arranged with said servo-motor; a throttle connected parallel to said rotary motor for by-passing the same; a rack-bar driven by said rotary flow motor; a spring biasing said rack-bar towards a predetermined position, whereby also the rotary motor becomes biased; and means for exerting in response to movements of said rack-bar a restoring force on said relay in opposition to said controlling force.

10. Control device comprising, in combination, a pressure fluid relay; means for exerting a positional impulse on said relay; a pressure fluid operated servo-motor connected to be actuated by said relay; a rotary flow motor serially arranged with said servo-motor; a throttle connected parallel to said rotary motor for by-passing the same; a rack-bar driven by said rotary flow motor; a spring biasing said rack-bar towards a predetermined position, whereby also the rotary motor becomes biased; and means for exerting in response to movements of said rack-bar a positional impulse on said relay in opposition to said controlling impulse, thereby restoring the relay to its neutral position.

11. Control device comprising, in combination, a jet-pipe relay; means for exerting a controlling force on said relay; a pressure fluid operated servo-motor connected to be actuated by said relay; a slide-vane motor serially arranged with said servo-motor; a throttle connected parallel to said slide-vane motor for by-passing the same; a rack-bar driven by said slide-vane motor; a spring biasing said rack-bar towards a predetermined position, whereby also the slide-vane motor becomes biased; and means for exerting in response to movements of said rack-bar a restoring force on said relay in opposition to said controlling force.

12. Control device comprising, in combination, a jet-pipe relay; means for exerting a positional impulse on said relay; a pressure fluid operated servo-motor connected to be actuated by said relay; a slide-vane motor serially arranged with said servo-motor; a throttle connected parallel to said slide-vane motor for by-passing the same; a rack-bar driven by said slide-vane motor; a spring biasing said rack-bar towards a predetermined position, whereby also the slide-vane motor becomes biased; and means for exerting in response to movements of said rack-bar a positional impulse on said relay in opposition to said controlling impulse, thereby restoring the relay to its neutral position.

KURT BLASIG.